Jan. 25, 1955

E. G. BOICE 2,700,443

TORQUE CLUTCH

Filed March 17, 1950

Elvin G. Boice
INVENTOR.

BY

ATTORNEY

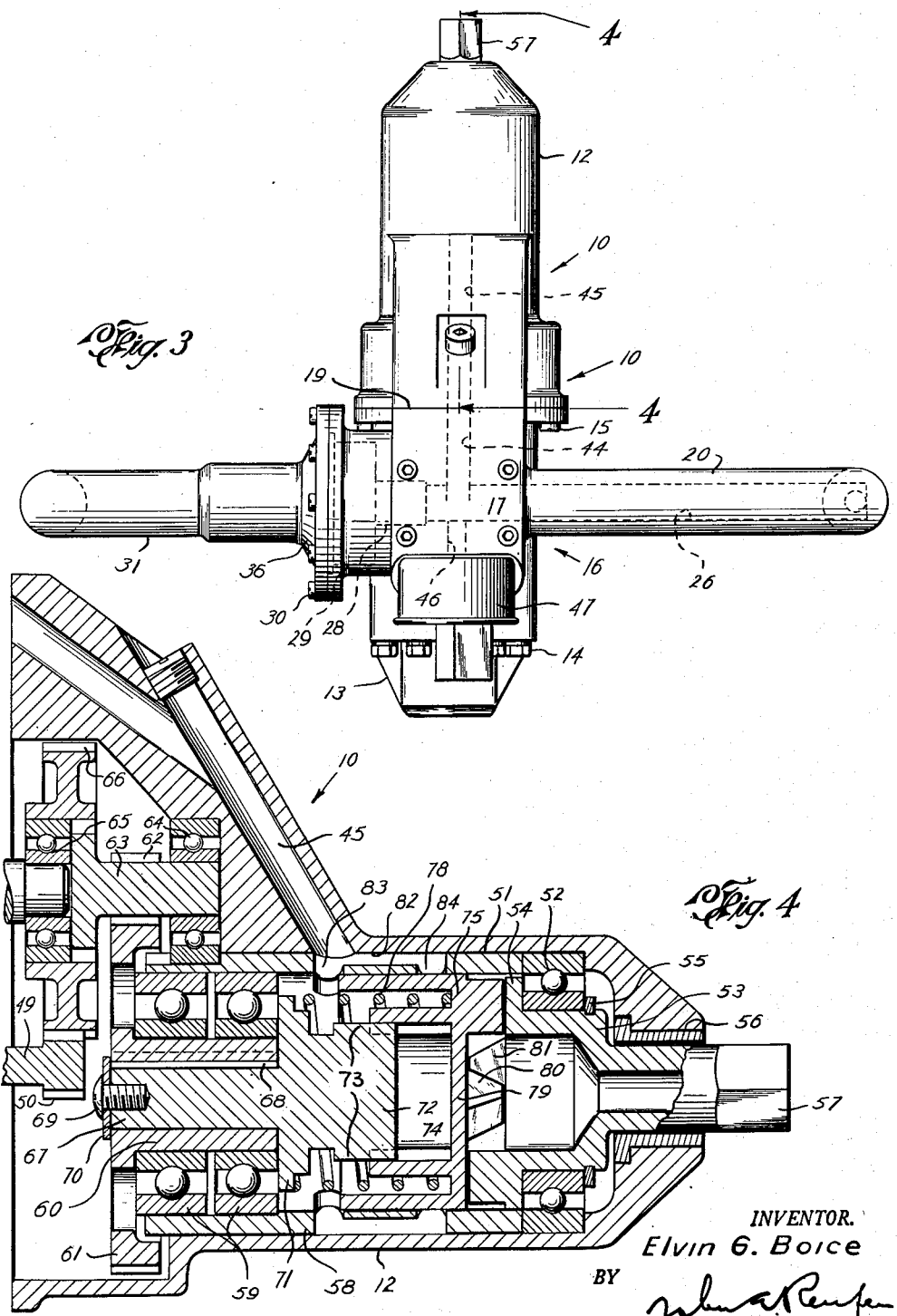

Jan. 25, 1955 E. G. BOICE 2,700,443
TORQUE CLUTCH
Filed March 17, 1950 3 Sheets-Sheet 3
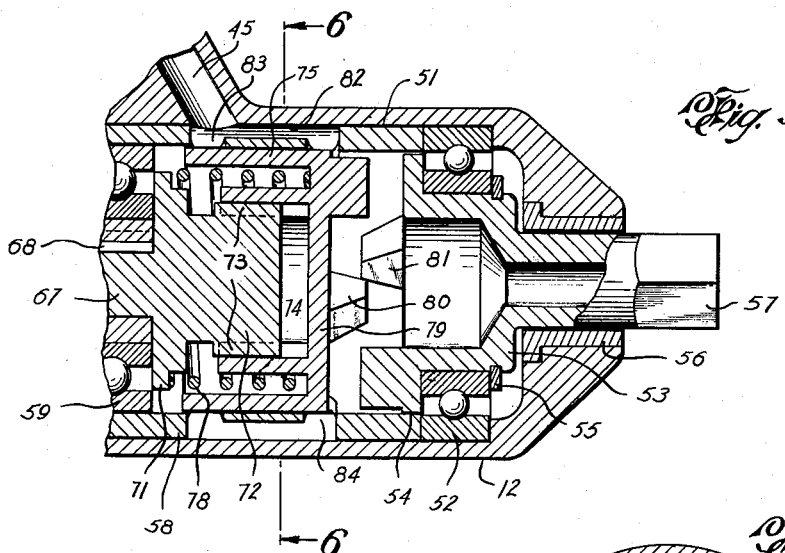
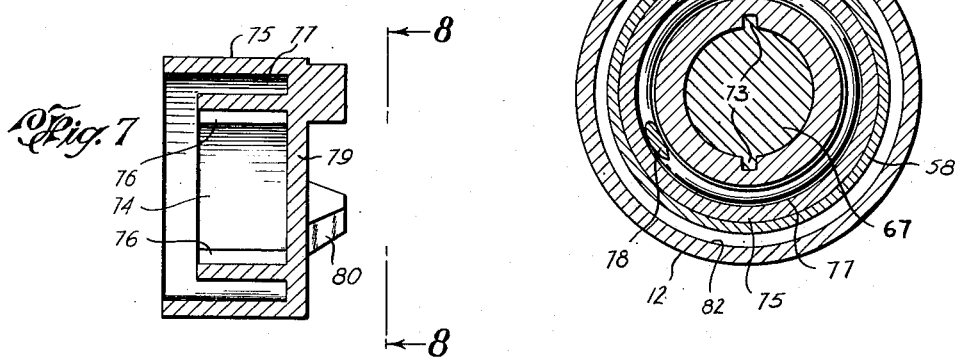
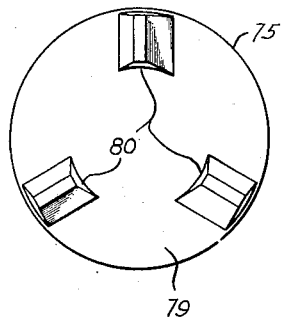
Elvin G. Boice
INVENTOR.
BY
ATTORNEY United States Patent Office 2,700,443
Patented Jan. 25, 1955

2,700,443

TORQUE CLUTCH

Elvin G. Boice, Houston, Tex., assignor to Reed Roller Bit Company

Application March 17, 1950, Serial No. 150,205

5 Claims. (Cl. 192—56)

This invention relates broadly to clutches, but more particularly to torque responsive clutches used primarily in fluid actuated portable tools such as nut setters, screw drivers and the like.

This invention is a continuation in part of the co-pending application Serial No. 126,430, filed November 9, 1949.

One object of this invention is to transmit torque between driving and driven shafts through a clutch mechanism capable of automatic release when the torque reaches a predetermined maximum.

Another object of this invention is to provide a torque responsive clutch with simple and efficient means assuring positive release of the clutch.

Another object of this invention is to provide a torque responsive clutch with means for automatically relieving the clutch jaws, prior to their complete disengagement, from torque pressure tending to effect wear and breakage of the extreme outer end portions of the jaws.

Another object of this invention is to produce a clutch capable of transmitting a controlled torque, the control being readily accessible to the operator, thereby rendering the tool with which the clutch is associated, applicable, for instance, for setting screws or the like of different sizes without necessitating the use of tools of different capacities.

Another object of this invention is to provide a portable fluid actuated tool, such as a screw driver, with a fluid actuated torque responsive clutch, the fluid being preferably compressed air which, for the purpose of actuating the clutch, has its pressure regulated at the will of the operator for producing automatic clutch releases under different maximum torque loads.

Another object of this invention is to produce a controlled torque transmitting clutch that operates in either direction.

Another object of this invention is to produce such clutch with cooperating parts arranged and disposed in a manner requiring a minimum number of ports for admitting and exhausting the operative fluid to and from the clutch.

Still another object of this invention is to provide such fluid actuated nut setters, screw drivers and the like with a torque indicator through which the operator can readily ascertain the torque capacity for which the improved clutch has been adjusted, thereby assuring that the work to which the tool is applied will be performed at the proper or desired torque.

A still further object of this invention is to provide such tools with a suitable handle through which the tool can be applied to, maintained or removed from the work with a minimum amount of effort on the part of the operator.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combinations of parts and specific constructions indicative of the scope or spirit of this invention.

Referring to the drawings, in which like symbols designate corresponding parts throughout the several views, Figure 1 is a diagrammatic side elevational view, partly in section, of a fluid actuated portable tool embodying the invention.

Figure 3 is a diagrammatic plan view of the tool shown in Figures 1 and 2.

Figure 4 is an enlarged longitudinal sectional view taken through line 4—4 in Figure 3.

Figure 5 is a portion of the view shown in Figure 4, but illustrating parts in different positions.

Figure 6 is a cross sectional view taken through line 6—6 in Figure 5.

Figure 7 is a longitudinal sectional view of one part of the clutch.

Figure 8 is an end elevational view taken in the direction of the arrows 8—8 in Figure 7.

Figures 1, 2:
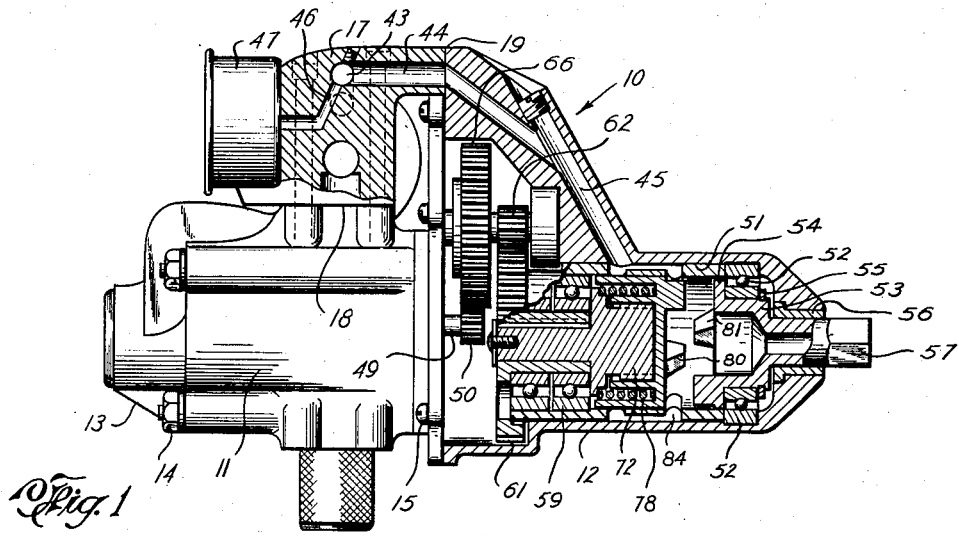
Figure 2 is a diagrammatic rear elevational view, partly in section, of the tool shown in Figure 1.

In the drawings, 10 generally represents a fluid actuated portable tool or motor having a main housing 11, a front housing 12 and a back head 13. These housings and back head are adequately screwed in position by any suitable means such as bolts 14 and screws 15.

Secured to the front face of the main housing 10, there is a handle assembly generally designated by 16, which comprises a central portion 17 adequately clamped against the main housing and front housing to form fluid tight joints 18 and 19. From the central portion 17 there extends laterally and to the right as seen in Figure 2, a handle bar 20 having secured in its free end a handle grip 21 which extends at right angles therefrom. The handle grip 21 is terminated by a screw threaded connection, not shown, adapted to receive the corresponding end of a fluid conveying conduit, such as a hose, through which motive fluid such as compressed air may be admitted into the handle grip. Also provided in the handle grip 21 there is a suitable throttle valve 22 operable by a throttle valve handle or trigger 23, which is pivotally connected to the handle grip by a cross pin 24. From the throttle valve, motive fluid is free to flow through a handle grip port 25 and handle bar port 26 into the tool housing 11 through a port 27. The handle bar port 26 terminates in the central portion 17 where it is provided with a counterbore 28 opening into a relatively large cylindrical chamber 29.

Secured to the central portion 17 by bolts 30, there is a second handle bar 31 extending laterally therefrom in axial alignment with the handle bar 20 but toward the left as seen in Figure 2. This handle bar has a bore 32 extending centrally therethrough and about equidistant from its ends, it is reduced in diameter and threaded as at 33 to accommodate a screw 34 which can be rotated by a screw driver inserted through the open outer end of the bore 32. The inner end portion of the bore 32 is enlarged as at 35 and terminated by a flared out portion 36 having an end diameter equal to that of the cylindrical chamber 29.

Clamped between the inner end of the handle bar 31 and the central portion 17, there is a diaphragm 37 extending as a cross partition between the chamber 29 and the flared end 36 of the handle bar 31. This diaphragm is part of a pressure regulator which also includes a valve 38 partly housed in the counterbore 28 of the port 26 and capable of moving into more or less open position relative thereto. The valve has a stem 39 resting against one side of the diaphragm 37, while the other side is supported by a compression spring 40, the compression of which can be adjusted by the screw 34. The spring supported side of the diaphragm 37 is vented through a port 41. Also secured to the handle bar 31, there is a handle grip 42 extending therefrom in the same direction as and in parallel with the handle grip 21.

Motive fluid admitted into the chamber 29 through the pressure regulating valve 38 is free to flow therefrom through a passageway formed by ports 43, 44 and 45, into the front housing 12 for the purpose hereinafter described, and also through a passageway 46 into a gauge 47 mounted on the central portion 17 with its dial 48 readily visible by the operator.

In the main housing 11, there is a fluid actuated rotary motor of any suitable type well known in this art, and since the motor itself is not a part of this invention no further explanation is thought necessary other than pointing out that the motor shaft 49 extends into the front housing 12 where it is terminated by a pinion 50.

The front housing 12 is preferably made of relatively light non-ferrous metal such as aluminum, and is provided with a cylindrical bore 51 having a ball bearing 52 mounted in its outer end. A driven clutch member 53 is rotatably supported in the bearing 52, and held against axial movement in one direction by an annular flange 54 resting against the inner gauge of the ball bearing 52, and in the other direction by a split ring 55 carried by the member 53 and engaging the other side of the bearing 52. Driven member 53 extends through the outer end of the front casing 12 where it is rotatably guided in an insert or bushing 56, and is terminated outside of the front housing by a square or polygonal shank 57 adapted to drivingly receive a screw driver, socket wrench or any other work performing implement.

Above the ball bearing 52, the front housing is lined with a metal sleeve 58 of good bearing quality, the inner end portion of which has its interior slightly enlarged to accommodate two ball bearings 59, within which is rotatably supported the integral skirt 60 of a relatively large gear 61. This last gear meshes with a pinion 62, which is cut on a parallel shaft 63, and adequately supported by ball bearings 64 and 65. Above the pinion 62, the shaft 63 also carries a relatively large gear 66 meshing with the motor pinion 50.

In the skirt 60 of the gear 61, there is a driving element 67 secured to the skirt by a key 68. This element has its inner end about flush with the gear 61 and adequately machined to receive a screw 69, which through a washer 70, prevents axial movement of the element in one direction, while in the other direction it is prevented by an annular flange 71 resting against one of the bearings 59. Driving element 67 has its outer end portion or head 72 normally cylindrical, but provided with two diametrically opposed laterally extending lugs 73, Figure 6. The head 72 fits into the corresponding socket 74 of a driving clutch member 75, Figure 7, which socket has longitudinally extending grooves 76 accommodating the lugs 73, thus forming a spline connection between the driving element 67 and the driving clutch member 75. Surrounding the socket 74, there is provided a relatively deep annular groove 77, on the bottom of which rests one end of a compression spring 78, while the other end rests on the annular flange 71 of the driving element 67. Externally, the driving clutch member 75 is cylindrical and in rotatable guided engagement with the inner wall of the sleeve 58. It is divided by a partition or cross wall 79 forming two opposed pressure areas, one being the bottom of the socket 74, and the other the bottom of three driving jaws 80 which extend longitudinally therefrom in equal space relation with each other. Each side wall of the jaws is inclined or tapered outwardly to form with the cross wall 79 an obtuse angle, or when considered with a perpendicular to the cross wall, it forms an acute angle hereinafter referred to as driving angle. The driving jaws 80 are engageable with similar jaws 81 provided on the inner end of the driven clutch member 53.

Intermediate its ends, the sleeve 58 is formed with an external annular groove 82 having its ends opening into the interior of the sleeve through two sets of ports 83 and 84. The groove 82 is in constant communication with the port 45.

In the operation of the device, with the throttle valve 22 open, motive fluid conveyed to the free end of the handle grip 21, will flow via the port 25 and handle bar port 26 into the main casing 11 through the port 27, thereby actuating the motor and imparting rotation to the motor pinion 50. From pinion 50 rotation at reduced speed is transmitted to the driving element 67 through the gears 66, 62 and 61, and the key 68. Since the driving clutch member 75 is splined on the head of the driving element 67, it will be understood that driving clutch member will rotate at the same speed and direction as the driving element 67. With the clutch member 75 in the position shown in Figure 4, the driving jaws 80 are in full operative engagement with the driven jaws 81 of the driven clutch member 53 for transmitting rotation thereto. From the shank 57, rotation may be transmitted to any desired tool implement mounted thereon for rotation therewith to perform the work.

With the driving clutch member 75 in the full operative position as shown in Figure 4, the ports 83 are uncovered by the inner end of the member 75, while the ports 84 are covered by its outer end. With the ports 83 uncovered, the pressure fluid supplied to the groove 82, via the port 45, in the manner hereinafter described, will flow into the sleeve 58 and exert pressure on the inner wall of the driving member 75, the bottom end of groove 77 and socket 74. This axial pressure together with the effort of the compression spring 78 will tend to maintain the driving clutch member 75 in operative engagement with the driven clutch member 53.

The driving angle of the jaws 80 and 81 is such that when torque is transmitted from the driving member 75 to the driven member 53, there will be a tendency to force the driving member away from the driven member, that is, cause the disengagement of the clutch. The amount of torque transmittable from one clutch member to the other depends on the angular relationship of the clutch jaws 80 and 81, the coefficient of friction between the engaged faces of the jaws, and on the amount of force or axial pressure applied on the driving member 75 in a direction opposing the inner movement or release of the clutch member 75, which pressure may be referred to as clutch engaging pressure.

When the torque of the shank 57 exceeds the clutch engaging pressure, the driving clutch member 75 will move inwardly or away from the driven clutch member and be released from driving engagement therewith. This clutch release movement is effected by virtue of the angular relationship of the jaws 80 and 81, which perform as cams acting against each other for causing axial movement of the driving member 75 relative to the driven member 53.

As the clutch jaws 80 and 81 reach partial disengagement, as shown in Figure 5, the outer end of the clutch driving member 75 will uncover the ports 84 while the inner end of the driving member will cover the ports 83. With the ports 83 closed, the pressure fluid previously admitted therethrough will now be dissipated around the motor shaft 49, into the main housing 11 and exhaust through the regular exhaust port of the fluid actuated motor. This exhaust of course takes place even when the ports 83 are uncovered for admitting pressure fluid into the sleeve 58, but because the exhaust takes place at a lower rate of speed than the intake, the pressure fluid admitted through the ports 83 acts in the manner and with the result above referred to. With the ports 84 uncovered, pressure fluid is now free to flow into the sleeve 58 to exert pressure on the outer end of the driving clutch member 75 for automatically shifting it against the effort of the spring 78, that is into clutch released position. Admission of the pressure fluid on the front or outer end of the clutch member 75 is calculated to take place and become effective to release the clutch before complete disengagement of the clutch jaws through the camming action of the jaws against each other, thereby relieving the extreme outer end portions of the jaws 80 and 81 from having to be subjected to torque pressure for effecting final release of the clutch. In other words, initial release movement of the clutch is effected through the camming action of the inclined side walls of the jaws 80 and 81 subjected to torque, which results in the rotary and axial release movement of the driving member 75, while the final release movement is effected only by the action of the pressure fluid admitted through the ports 84, which results in the axial movement of the driving member 75 without rotation.

When the clutch is fully released as shown in Figure 1, as long as the throttle valve 22 remains open, the pressure fluid will be supplied to the front end of the driving member 75, in the manner above described, to maintain the clutch in released position.

When it is desired to re-engage the clutch, the throttle valve 22 will have to be momentarily shut off, to cut off the supply of the pressure fluid to the outer end of the driving member 75 through the ports 84, and enable the spring 78 to return the driving member in its clutch engaging position as shown in Figure 4. From the outer end of the clutch driving member, there is restricted passageway provided by a small clearance between the shank 57 and bushing 56, enabling a certain amount of pressure fluid to exhaust therethrough when supplied through the ports 83. When the throttle valve is shut off, and the supply of pressure fluid through the ports 83, cut off, the pressure fluid previously acting on the outer end of the clutch driving member 75 will exhaust therefrom through the clearance above referred to, enabling the clutch member 75 to be moved into clutch operative position by the spring 78. When the throttle valve is again open, pressure fluid will again be admitted into the casing 11 for actuating the motor and importing rotation to the driving clutch member 75. Pressure fluid will also flow again via the sleeve 58 through the ports 83 for exerting pressure on the driving clutch member, and together with the spring 78, maintain it in operative engagement.

Since the torque capacity of the clutch is responsive to the pressure of the fluid on the inner end of the driving clutch member 75, it will be understood that this torque capacity may be varied by changing the pressure of the fluid. To that end, there is incorporated in the handle 16, a pressure regulator which includes the valve 38 normally closing the inner end of the port 26 by the action of the spring 40. The diaphragm 37 acts as a flexible cover for the chamber 29, and has the stem 39 of the valve resting against it. When the throttle valve 22 is open, the motive fluid in the port 26 will act on the valve 38 to open it relative to the counterbore 28 for admitting pressure fluid in the chamber 29. The extent of opening of the valve will of course depend on the extent of compression of the spring 40, which compression is adjustable through the screw 34. By turning the screw to the right, that is to further compress the spring 40, it will reduce the extent of opening of the valve and of course admit less pressure fluid into the chamber 29. By turning the screw 34 to the left, that is to decompress the spring 40, the valve 38 will be able to open to a greater extent and therefore admit more pressure fluid in the chamber 29. Since the chamber 29, ports 43, 44 and 45 together with the unused part of the interior of the front housing 12 actually form a chamber of substantially uniform volumetric capacity, in which pressure fluid, passing through the valve 38 is admitted, it will be understood that the extent of pressure of this fluid depends on the quantity of fluid admitted into the front housing. It will therefore also be understood that the valve 38 while controlling the quantity of fluid supplied into the front housing automatically acts as a pressure regulator. To prevent pressure from building up in the front housing, there are provided the exhausting means above referred to, that is the clearance around the motor shaft 49 and the clearance around the shank 57.

From the ports 43—44, pressure fluid is also supplied to the gauge 47 through the port 46. This gauge is provided with a dial 48 graduated in foot pounds, thereby enabling the operator to ascertain the torque capacity at which the tool is adjusted before use. When the work to be performed requires a different torque, it is a simple matter for the operator to turn the throttle valve 22 on and turn the screw 34 until the gauge 47 registers the desired torque output.

The handle 16 which is substantially U shaped with the motor located between the two handle grips 21 and 42, has been found very effective in carrying the tool from one screw, nut or bolt to another and for holding it to the work. This bicycle handle-bars type of handle has been found very comfortable to the hands of the operator and offers sufficient leverage to resist the slight torque reaction to which the tool is subjected when the work is driven home.

Although the foregoing description is necessarily of a detailed character, in order to completely set forth the invention, it is to be understood that the specific terminology is not intended to be restrictive or confining and it is further understood that various rearrangements of parts and modifications of structural detail may be resorted to without departing from the scope or spirit of the invention as herein claimed.

I claim:
1. In a clutch, a pair of axially aligned clutch members having interengageable clutch jaws on their opposed faces for transmitting torque from one to the other, said jaws having sloping cooperating faces whereby jaw disengaging movement of one of said members is automatically effected when said torque reaches a predetermined maximum, pressure fluid conveying means controlled by said one member admitting pressure fluid on one side thereof when in jaw engaged position and on the other side when in jaw disengaged position, and means affording uninterrupted but restricted exhaust for said pressure fluid from said one member.

2. In a clutch, a pair of axially aligned clutch members having interengageable clutch jaws on their opposed faces for transmitting torque from one to the other, said jaws having sloping cooperating faces whereby jaw disengaging movement of one of said members is automatically effected when said torque reaches a predetermined maximum, pressure fluid conveying means controlled by said one member admitting pressure fluid on one side thereof when in jaw engaged position and on the other side when in jaw disengaged position, and means affording uninterrupted but restricted exhaust for said pressure fluid from both sides of said one member.

3. In a clutch, a pair of axially aligned clutch members having interengageable clutch jaws on their opposed faces for transmitting torque from one to the other, said jaws having sloping cooperating faces whereby jaw disengaging movement of one of said members is automatically effected when said torque reaches a predetermined maximum, pressure fluid conveying means controlled by said one member admitting pressure fluid on one side thereof when in a fixed position, and means independent of said pressure fluid conveying means affording uninterrupted but restricted exhaust for said pressure fluid from said one side of said one member.

4. In a clutch, a pair of axially aligned clutch members having interengageable clutch jaws on their opposed faces transmitting torque from one to the other, a pressure area on one of said members, inlet means admitting compressed air on said area for normally maintaining said jaws in operative engagement, cooperating cam means on said jaws automatically effecting their release when said torque overcomes the force of the compressed air on said area, and pressure regulating means within said inlet means including a manually operable adjusting screw for varying the pressure of the compressed air admitted on said area.

5. In a clutch, a pair of axially aligned clutch members having interengageable clutch jaws on their opposed faces transmitting torque from one to the other, a pressure area on one of said members, inlet means admitting compressed air on said area for normally maintaining said jaws in operative engagement, cooperating cam means on said jaws automatically effecting their release when said torque overcomes the force of the compressed air on said area, a spring loaded valve normally closing said inlet means, said valve being subjected to the pressure of the compressed air in said inlet means and opened thereby against its spring load, and a screw operable for selectively adjusting the spring load of said valve.

References Cited in the file of this patent

UNITED STATES PATENTS

| | | |
|---|---|---|
| 928,679 | Mather | July 20, 1909 |
| 2,128,761 | Thomas | Aug. 30, 1938 |
| 2,293,787 | Worden | Aug. 25, 1942 |
| 2,476,632 | Shaff | July 19, 1949 |
| 2,565,579 | Thorner | Aug. 28, 1951 |